US010267365B2

(12) United States Patent
Hasting

(10) Patent No.: US 10,267,365 B2
(45) Date of Patent: Apr. 23, 2019

(54) POWER GEARBOX PIN ARRANGEMENT

(71) Applicant: General Electric Company, Schenectady, NY (US)

(72) Inventor: William Howard Hasting, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 727 days.

(21) Appl. No.: 14/966,291

(22) Filed: Dec. 11, 2015

(65) Prior Publication Data

US 2017/0167540 A1     Jun. 15, 2017

(51) Int. Cl.
*F16C 1/00* (2006.01)
*F16C 35/067* (2006.01)
(Continued)

(52) U.S. Cl.
CPC ............ *F16C 35/067* (2013.01); *F02C 3/107* (2013.01); *F02C 7/36* (2013.01); *F16C 19/28* (2013.01); *F16C 33/6659* (2013.01); *F16H 1/28* (2013.01); *F16H 57/0479* (2013.01); *F16H 57/08* (2013.01); *F16H 57/082* (2013.01); *F05D 2240/50* (2013.01);
(Continued)

(58) Field of Classification Search
CPC .... F02C 3/107; F02C 7/36; F16H 1/28; F16H 57/0479; F16H 57/08; F16H 57/082; F16H 57/023; F16H 2057/085; F05D 2260/40311
USPC ........................................................ 475/331
See application file for complete search history.

(56) References Cited

U.S. PATENT DOCUMENTS 6,170,252 B1   1/2001  Van Duyn
7,752,834 B2   7/2010  Addis
(Continued)

FOREIGN PATENT DOCUMENTS

CN    104081025 A   10/2014
CN    104204459 A   12/2014
(Continued)

OTHER PUBLICATIONS

Machine Translation and First Office Action and Search issued in connection with corresponding CN Application No. 201611138983.0 dated Jan. 19, 2018.
(Continued)

*Primary Examiner* — Pascal M Bui Pho
*Assistant Examiner* — Edwin Kang
(74) *Attorney, Agent, or Firm* — General Electric Company; Pamela Kachur

(57) ABSTRACT

A planet gearbox has a planet gear rotatable on a planet bearing that includes an inner ring that is mounted to a carrier of an epicyclic gearing arrangement. A respective cylindrical inner surface of each opposite respective end of the inner ring is non-rotatably connected to a respective cylindrical outer surface of a respective one of a pair of support plugs that are fixed to the carrier of the epicyclic gearing arrangement. A gas turbine engine includes a fan and LP shaft, which couples a compressor to a turbine. An epicyclic gearing arrangement has a single input from the LP shaft coupled to a sun gear, a single output coupled to the fan's shaft, and at least one planet bearing as described above.

20 Claims, 6 Drawing Sheets

(51) Int. Cl.
  *F02C 3/107* (2006.01)
  *F02C 7/36* (2006.01)
  *F16C 19/28* (2006.01)
  *F16C 33/66* (2006.01)
  *F16H 1/28* (2006.01)
  *F16H 57/04* (2010.01)
  *F16H 57/08* (2006.01)

(52) U.S. Cl.
  CPC ............... *F05D 2260/40311* (2013.01); *F16C 2360/23* (2013.01); *F16C 2361/61* (2013.01); *F16H 2057/085* (2013.01); *Y02T 50/671* (2013.01)

(56) References Cited

U.S. PATENT DOCUMENTS

| | | |
|---|---|---|
| 8,172,717 B2 | 5/2012 | Lopez et al. |
| 8,237,298 B2 | 8/2012 | Lemmers, Jr. |
| 8,550,957 B2 | 10/2013 | Erno et al. |
| 2008/0028612 A1 | 2/2008 | Shirokoshi |
| 2010/0317477 A1* | 12/2010 | Sheridan ............ F02C 7/06 475/159 |
| 2012/0277056 A1* | 11/2012 | Erno ............ F16H 1/2836 475/331 |
| 2013/0023378 A1* | 1/2013 | McCune ............ F16H 57/082 475/344 |
| 2013/0269470 A1 | 10/2013 | Ohba et al. |
| 2013/0269479 A1* | 10/2013 | van der Merwe .... F16H 57/025 74/606 R |

FOREIGN PATENT DOCUMENTS

| | | |
|---|---|---|
| EP | 1010878 A3 | 11/2002 |
| JP | 2003-227550 A | 8/2003 |
| WO | 2013/043822 A2 | 3/2013 |

OTHER PUBLICATIONS

Extended European Search Report and Opinion issued in connection with corresponding EP Application No. 16202418.6 dated Apr. 18, 2017.

* cited by examiner

POWER GEARBOX PIN ARRANGEMENT

FIELD OF THE INVENTION

The present subject matter relates generally to a cylindrical roller bearing, or more particularly to a cylindrical roller bearing for the planet gear in an epicyclic gearbox in a gas turbine engine.

BACKGROUND OF THE INVENTION

A gas turbine engine generally includes a fan and a core arranged in flow communication with one another with the core disposed downstream of the fan in the direction of the flow through the gas turbine. The core of the gas turbine engine generally includes, in serial flow order, a compressor section, a combustion section, a turbine section, and an exhaust section. With multi-shaft gas turbine engines, the compressor section can include a high pressure compressor (HP compressor) disposed downstream of a low pressure compressor (LP compressor), and the turbine section can similarly include a low pressure turbine (LP turbine) disposed downstream of a high pressure turbine (HP turbine). With such a configuration, the HP compressor is coupled with the HP turbine via a high pressure shaft (HP shaft), and the LP compressor is coupled with the LP turbine via a low pressure shaft (LP shaft).

In operation, at least a portion of air over the fan is provided to an inlet of the core. Such portion of the air is progressively compressed by the LP compressor and then by the HP compressor until the compressed air reaches the combustion section. Fuel is mixed with the compressed air and burned within the combustion section to provide combustion gases. The combustion gases are routed from the combustion section through the HP turbine and then through the LP turbine. The flow of combustion gasses through the turbine section drives the HP turbine and the LP turbine, each of which in turn drives a respective one of the HP compressor and the LP compressor via the HP shaft and the LP shaft. The combustion gases are then routed through the exhaust section, e.g., to atmosphere.

The LP turbine drives the LP shaft, which drives the LP compressor. In addition to driving the LP compressor, the LP shaft can drive the fan through a power gearbox of an epicyclic gearing arrangement, which allows the fan to be rotated at fewer revolutions per unit of time than the rotational speed of the LP shaft for greater efficiency. The power gearbox rotatably supports a sun gear that is disposed centrally with respect to a ring gear and a plurality of planet gears, which are disposed around the sun gear and engage between the sun gear and the ring gear. The LP shaft provides the input to the epicyclic gearing arrangement by being coupled to the sun gear, while the fan can be coupled to rotate in unison with the carrier of the planet gears or with the ring gear. Each planet gear meshes with the sun gear and with the ring gear. One of the carrier or the ring gear may be held stationary, but not both of them. Each planet gear is rotatable on its own bearing that is mounted on a support pin housed within the power gearbox, which is fixed to the peripheral region of the carrier of the epicyclic gearing arrangement. The shaft of the fan is rotatable on its own bearing that is housed in a sun gearbox, which is also called the fan gearbox.

For any given gas turbine engine application, the planet gears are designed to provide a set reduction ratio between the rotational speed of the LP shaft and the rotational speed of the fan shaft. Because each power gearbox that houses each planet gear is disposed within the flow path of the gas turbine engine, the challenge is to design on the one hand a reliable and robust power gearbox that meets all flight conditions of the engine while on the other hand designing a power gearbox that is compact sufficiently to fit inside the flow path in a way that does not require the entire engine size to be larger and heavier than otherwise would be needed in order to accommodate the power gearbox.

The carrier for the planet gears of the power gearbox desirably is formed as a single monolithic part so as to minimize gear misalignment. However, this one piece carrier can complicate mounting each planet bearing to the carrier. Mounting each planet bearing to the carrier via a conventional support pin that is held in the carrier by a bolt and spanner nut configuration involves the added weight of the support pin and the spanner nut. In order to meet the necessary design requirements, the clamp loads from the support pin and spanner nut configuration result in very high axial loads. These increased loads reduce design robustness and add weight to the design. The highest stresses in the existing support pin design are believed to result from the stresses induced by the spanner nut torque that must be applied during the mounting assembly rather than from stresses that occur during normal operation of the power gearbox.

Moreover, because the current support pin design requires a press fit along a substantial length of the support pin and inner ring of the bearing, the following assembly problems are presented. More than a six inch long press fit support pin must be dropped into two sides of the carrier, and this requires a large temperature difference between the support pin and the inner ring and two sides of the carrier. This creates an assembly risk whereby the support pin fails to drop all the way through the three mating pieces, and thus once the temperatures normalize the support pin will become stuck without the threads exposed. It then will become necessary to remove the support pin from the assembly, and a second attempt at assembly must be performed. The loads needed to remove the stuck support pin are high, and the failed attempt presents the additional risk that the surrounding hardware or the support pin itself becomes damaged in the process of removal and attempted reinsertion.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a bearing for a planet gear of the power gearbox of a gas turbine engine is provided. The power gearbox includes an epicyclic gearing arrangement that has at least two planet bearings. The LP shaft of a turbofan engine provides the rotational input to the power gearbox, and the output from the power gearbox is provided to rotate the fan shaft of the turbofan engine. In one exemplary planetary embodiment, each planet gear has an outer ring that includes a gear tooth surface that meshes with a sun gear input and a stationary ring gear to impart an output of reduced rotational speed to the carrier of the planet gears. In another exemplary star embodiment, each planet gear has an outer ring that includes a gear tooth surface that meshes with a sun gear input while the carrier is held stationary to impart an output of reduced rotational speed to the ring gear. In yet a third embodiment, each planet gear has an outer ring that includes a gear tooth surface that meshes with a ring gear input while the sun gear is held stationary to impart an output of reduced rotational speed to the carrier.

A cylindrical inner surface of an inner ring of each planet bearing is non-rotatably connected to a cylindrical outer surface of a pair of support plugs that are fixed to the carrier of the epicyclic gearing arrangement. The inner ring defines a generally cylindrical shape having a virtual central axis of rotation. The inner ring defines a forward end and an aft end disposed axially spaced apart from the forward end. The inner ring has an interior surface that defines a hollow interior cavity having a forward opening and an aft opening disposed axially spaced apart from the forward opening. The inner ring's forward opening is defined by a forward annular surface facing inwardly toward the virtual central axis of rotation and having a larger diameter section and a smaller diameter section, the smaller diameter section being disposed closer to the midpoint of the virtual central axis of rotation than the larger diameter section.

The inner ring's aft opening is defined by an aft inner annular surface facing inwardly toward the virtual central axis of rotation and having a larger diameter section and a smaller diameter section, the smaller diameter section being disposed closer to the midpoint of the virtual central axis of rotation then the larger diameter section. The inner ring defines an outer surface facing outwardly away from the virtual central axis of rotation, the inner ring's outer surface defining at least one track, each track being configured to receive and rotatably guide therein a respective plurality of rotatable members, each rotatable member being freely rotatable with respect to the outer surface of the respective track of the inner ring.

As noted above, in addition to the inner ring, the planet gearbox includes a forward support plug and an aft support plug. The forward support plug is configured to be fixed to the carrier and the forward opening of the inner ring. The forward support plug defines a generally cylindrical shape about the virtual central axis and has a forward end and an aft end disposed axially apart from the forward end. The aft end of the forward support plug defines an outer surface that is radially equidistant from the virtual central axis and is configured to be received within the forward opening of the inner ring. The forward end of the forward support plug defines an outer surface that is radially equidistant from the virtual central axis and has a larger diameter than the outer surface of the aft end of the forward support plug.

Similarly, the aft support plug is configured to be fixed to the carrier and the aft opening of the inner ring. The aft support plug defines a generally cylindrical shape about the virtual central axis and has a forward end and an aft end disposed axially apart from the forward end. The forward end of the aft support plug defines an outer surface that is radially equidistant from the virtual central axis and is configured to be received within the aft opening of the inner ring. The aft end of the aft support plug defines an outer surface that is radially equidistant from the virtual central axis and has a larger diameter than the outer surface of the forward end of the aft support plug.

The outer surface of the forward end of the forward support plug is fixed by a press fit to the larger diameter section of the forward annular surface of the forward opening of the inner ring. Similarly, the outer surface of the aft end of the aft support plug is fixed by a press fit to the larger diameter section of the aft annular surface of the aft opening of the inner ring.

In another exemplary embodiment of the present disclosure, a gas turbine engine includes a compressor section having at least one compressor and a turbine section located downstream of the compressor section and including at least one turbine. The compressor section can include a low pressure compressor and a high pressure compressor downstream of the low pressure compressor. The turbine section includes a high pressure (HP) turbine and a low pressure (LP) turbine downstream of the HP turbine. The gas turbine engine also includes a low pressure shaft mechanically coupling the low pressure compressor to the low pressure turbine via an epicyclic gearing arrangement, which includes a power gearbox that includes two or more planet gears, each planet gear being rotatably supported by a respective planet bearing as summarily described above and in more detail hereinafter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF ILLUSTRATIVE EMBODIMENTS

Figure 1:
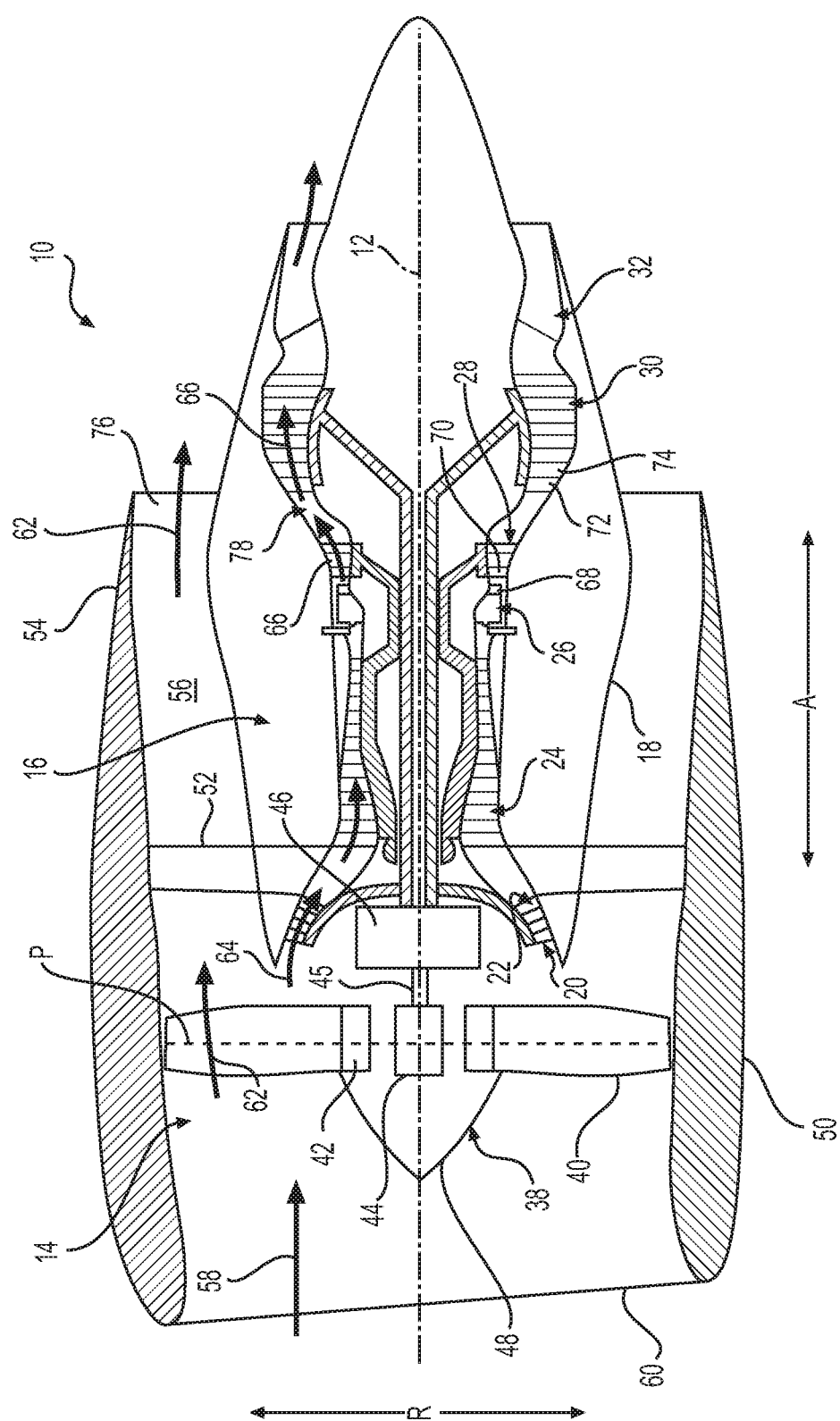
FIG. 1 is a schematic cross-sectional view of an exemplary gas turbine engine according to various embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or relative importance of the individual components.

Referring now to the drawings, wherein identical numerals indicate the same elements throughout the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R that is normal to the axial direction A. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. As schematically shown in FIG. 1, the outer casing 18 encases, in serial flow relationship, a compressor section including a booster or low pressure (LP) compressor 22 followed downstream by a high pressure (HP) compressor 24; a combustion section 26; a turbine section including a high pressure (HP) turbine 28 followed downstream by a low pressure (LP) turbine 30; and a jet exhaust nozzle section 32. A high pressure (HP) shaft or spool 34 drivingly connects the HP turbine 28 to the HP compressor 24 to rotate them in unison. A low pressure (LP) shaft or spool 36 drivingly connects the LP turbine 30 to the LP compressor 22 to rotate them in unison. The compressor section, combustion section 26, turbine section, and nozzle section 32 together define a core air flowpath.

For the embodiment depicted in FIG. 1, the fan section 14 includes a variable pitch fan 38 having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 via a fan shaft 45 that is powered by the LP shaft 36 across a power gear box 46. The power gear box 46 includes a plurality of gears for adjusting the rotational speed of the fan shaft 45 and thus the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Alternatively, the nacelle 50 also may be supported by struts of a structural fan frame. Moreover, a downstream section 54 of the nacelle 50 may extend over an outer portion of the core turbine engine 16 so as to define a bypass airflow groove 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrow 62 is directed or routed into the bypass airflow groove 56, and a second portion of the air 58 as indicated by arrow 64 is directed or routed into the upstream section of the core air flowpath, or more specifically into the inlet 20 of the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where the highly pressurized air is mixed with fuel and burned to provide combustion gases 66.

The combustion gases 66 are routed into and expand through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed into and expand through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and rotation of the fan 38 via the power gearbox 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow groove 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it also should be appreciated that in other exemplary embodiments, any other suitable LP compressor 22 configuration may be utilized. It also should be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, etc.

Figure 2:
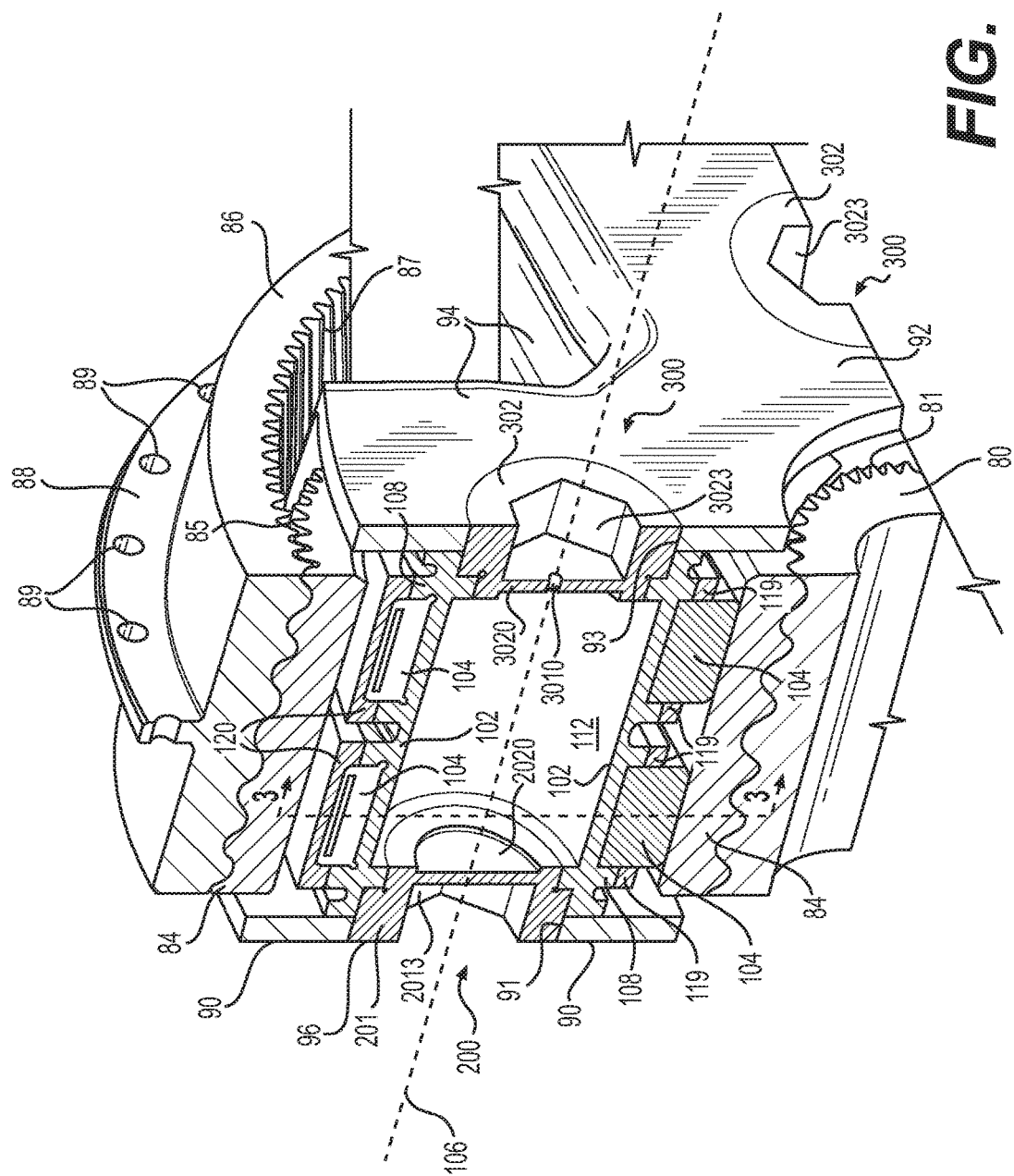
FIG. 2 is a view partially in perspective and partially in cross-section of components of a one quarter segment of an epicyclic gearing arrangement between the fan shaft and the LP shaft of the exemplary gas turbine engine of FIG. 1.
Figure 4:
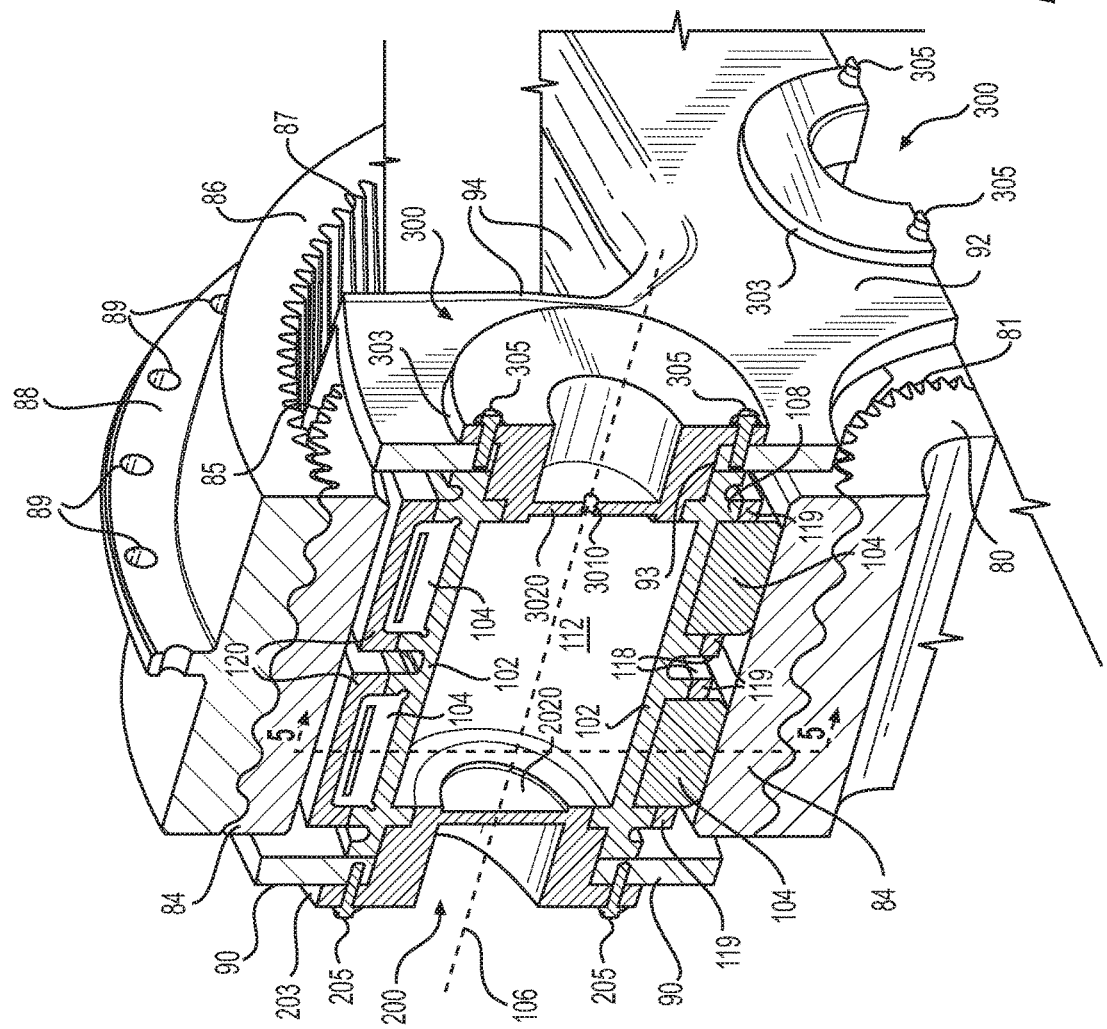
FIG. 4 is a view partially in perspective and partially in cross-section of components of a one quarter segment of an alternative embodiment of an epicyclic gearing arrangement between the fan shaft and the LP shaft of the exemplary gas turbine engine of FIG. 1.
Figure 6:
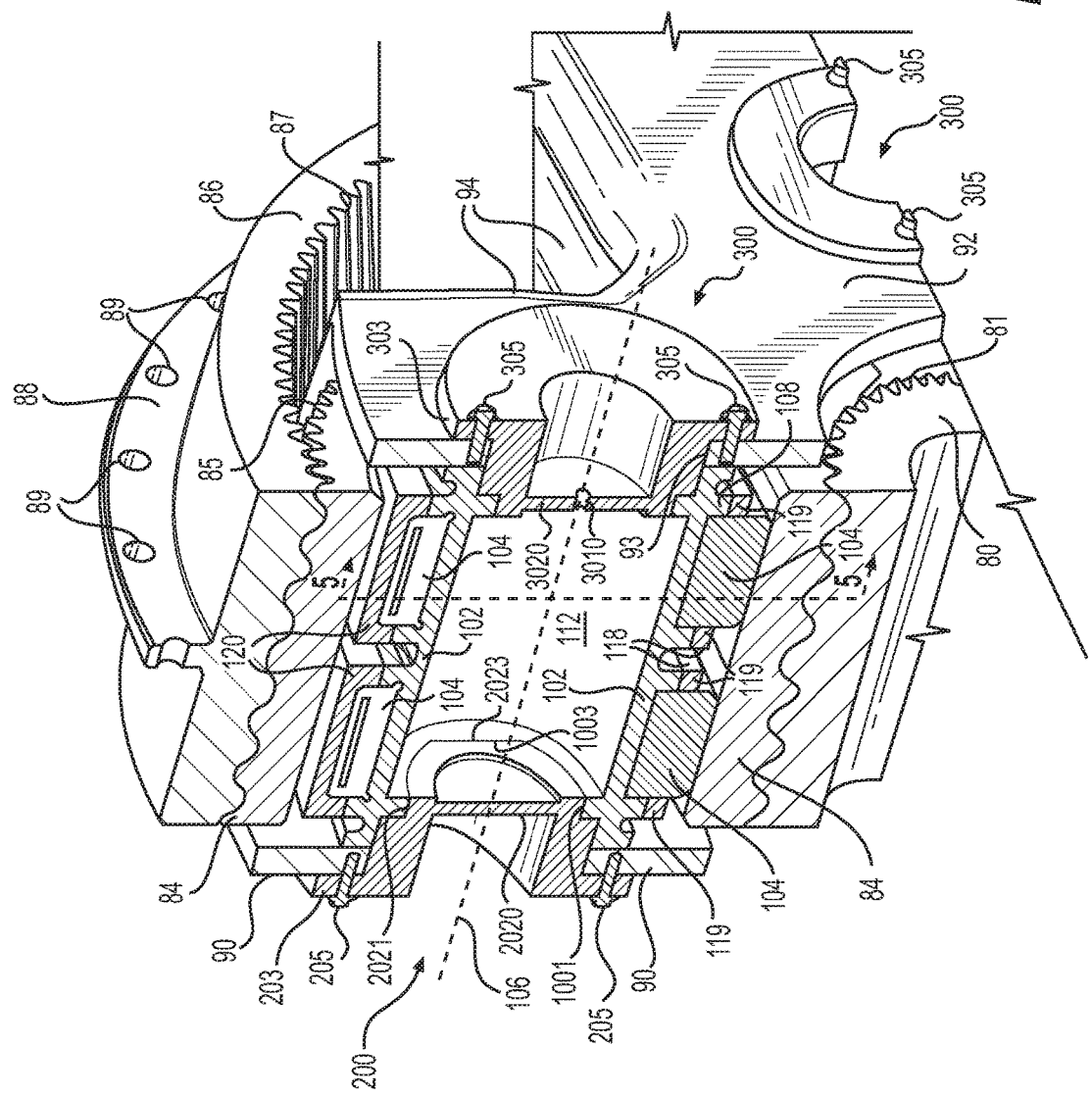
FIG. 6 is a view partially in perspective and partially in cross-section of components of a one quarter segment of another alternative embodiment of an epicyclic gearing arrangement between the fan shaft and the LP shaft of the exemplary gas turbine engine of FIG. 1.

The power gearbox 46 schematically shown in FIG. 1 includes a centrally-located sun gear 80 that is rotatable about the longitudinal axis 12 shown in FIG. 1. A one-quarter section of the sun gear 80 is shown in FIGS. 2, 4 and 6 for example. A carrier surrounds the sun gear 80, which is rotatable with respect to the carrier. The bearing that rotationally supports the sun gear 80 has been omitted from the drawings, as the bearing for the sun gear 80 is not the focus of the present disclosure. The carrier carries at least one planet gear 84 and desirably an annular array of planet gears 84, with cut-away portions of two planet gears 84 being visible in FIGS. 2, 4 and 6, each of which is rendered partly in a perspective view and partly in a cross-sectional view. In the illustrated example of the power gearbox 46 (FIG. 1)

there are four planet gears 84 but varying numbers of planet gears 84 may be used. The sun gear 80 desirably has a double-helical pattern of gear teeth 81. Each planet gear 84 desirably has a double helical pattern of gear teeth 85 that are configured to mesh with the gear teeth 81 of the sun gear 80.

The power gearbox 46 desirably is an epicyclic gearing arrangement having a ring gear 86 that is disposed circumferentially around the sun gear 80 and the planet gears 84 as schematically shown in FIGS. 2, 4 and 6 for example. In one exemplary embodiment, the ring gear 86 that surrounds the sun gear 80 and the planet gears 84 is rendered stationary by being coupled to the outer casing 18 in a manner that is not illustrated in the drawings, as this particular arrangement can be performed in any of a number of conventional manners, any one of which being suitable for purposes of illustrating exemplary embodiments of the present disclosure. For example, the ring gear 86 can be fixed (as by being mechanically bolted or welded) to the outer casing 18 via a central circumferential flange 88 that is drilled with a plurality of axial holes 89 therethrough as shown in FIGS. 2, 4 and 6 for example. In an alternative exemplary embodiment employing a star configuration of an epicyclic gearing arrangement, it is the carrier that is coupled to the outer casing 18, and the specifics of this coupling also are not needed for the explanation of the desired aspects of the present invention. However, in both embodiments, and as schematically shown in FIGS. 2, 4 and 6 for example, the ring gear 86 is rotatably enmeshed with each planet gear 84, which also is rotatably enmeshed with the sun gear 80, and thus the ring gear 86 also desirably has a double helical pattern of gear teeth 87 configured to mesh with the teeth 85 of the planet gear 84.

Collectively the sun gear 80, the planet gears 84, and the ring gear 86 constitute a gear train. As schematically shown in FIGS. 2, 4 and 6 for example, each of the planet gears 84 meshes with both the sun gear 80 and the ring gear 86. The sun gear 80, planet gears 84, and ring gear 86 may be made from steel alloys. One exemplary embodiment of the epicyclic gearing arrangement contemplated herein desirably is a planetary configuration that has only a single input and a single output, and the ring gear 86 is held stationary. In operation, the sun gear 80 is turned by an input that is the LP shaft, while the carrier that carries the planet gearboxes is coupled to a mechanical load that is the fan shaft 45 shown in FIG. 1. In this exemplary embodiment, the carrier is non-rotatably coupled to the fan shaft 45 in a conventional manner so that they rotate in unison at the same speed, but the manner of this coupling is not critical to an understanding of the present disclosure and thus need not be further discussed. Thus, in this exemplary embodiment, the power gearbox 46 is effective to reduce the rotational speed of the sun gear 80 in a known manner to a rotational speed appropriate for the load coupled to the carrier, namely, rotation of the fan shaft 45.

In an alternative embodiment employing a star configuration of an epicyclic gearing arrangement, it is the ring gear 86 that is non-rotatably coupled to the fan shaft 45 in a conventional manner so that they rotate in unison at the same speed. However, as noted above in the planetary gear embodiment, the manner of this coupling is likewise not critical to an understanding of the present disclosure and thus need not be further discussed.

Each of the planet gears 84 is rotatably carried by a bearing that is carried by a carrier that forms part of a planet gearbox. The construction and mounting of the bearing for one planet gear 84 onto the carrier will be described with the understanding that each of the planet gears 84 is constructed and mounted identically, though to different points on the carrier.

Each of FIGS. 2, 4 and 6 depicts examples of components of the power gearbox 46 constructed according to several aspects of the present disclosure. For purposes of illustrating features of the planet bearing that rotatably supports each planet gear, each of FIGS. 2, 4 and 6 schematically illustrates a view rendered partly in perspective and partly in cross-section and focused on the planet bearing components of a one quarter section of exemplary embodiments of a planetary gearbox configuration that desirably serves as a component of the power gearbox 46 identified in FIG. 1. The power gearbox 46 is an epicyclic type and has a central axis of rotation that desirably is coincident with the longitudinal axis 12 shown in FIG. 1 and includes four planet gears.

As schematically shown in FIGS. 2, 4 and 6 for example, the carrier includes a forward wall 90 and an aft wall 92 spaced axially apart from the forward wall 90 and together forming part of the carrier of each planet gearbox. As schematically shown in FIGS. 2, 4 and 6, each of the forward wall 90 and the aft wall 92 respectively defines therethrough a respective coaxial bore 91 and 93. As schematically shown in FIGS. 2, 4 and 6, the carrier desirably includes a plurality of sidewalls 94 that extend axially between and connect the forward and aft walls 90, 92 of the carrier. Desirably, pairs of the sidewalls 94 are disposed on opposite sides of the coaxial bores 91, 93 defined respectively through the respective forward and aft walls 90, 92 of the carrier.

In a conventional arrangement for mounting the planet bearing to the carrier of the power gearbox 46, the inner cylindrical surface of the inner ring of the planet bearing would be press fit to the outer cylindrical surface of a support pin. A conventional support pin, which is hollow and generally cylindrical, requires this press-fit to the inner ring of the planet bearing to occur along substantially the entirety of the interface between the support pin's outer cylindrical surface and the inner cylindrical surface of the inner ring. The support pin then is connected by a spanner nut configuration to the carrier.

In accordance with embodiments of the present invention, as shown in FIGS. 2, 3, 4, 5 and 6 for example, each planet bearing is mounted to a respective forward wall 90 and aft wall 92 of the carrier by a respective forward support plug 200 and an aft support plug 300. Each respective associated pair of forward support plug 200 and aft support plug 300 takes the place of a conventional support pin for mounting the planet bearing to the carrier of the power gearbox 46.

Each of these respective support plugs (forward 200 and aft 300) is mounted to the carrier via a respective coaxial bore 91 and 93 defined through the respective forward wall 90 and the aft wall 92. As shown in FIGS. 2, 3, 4, 5 and 6 for example, the forward support plug 200 is received in the bore 91 that is defined through the forward wall 90 of the carrier, and the aft support plug 300 is received in the bore 93 that is defined through the aft wall 92 of the carrier. Each pair of the support plugs 200, 300 is provided to mount the inner ring 102 of the bearing of the planet gear 84 to the carrier and thus is configured to be fixed to the carrier in a manner in accordance with the present invention as explained more fully below.

Figure 3:
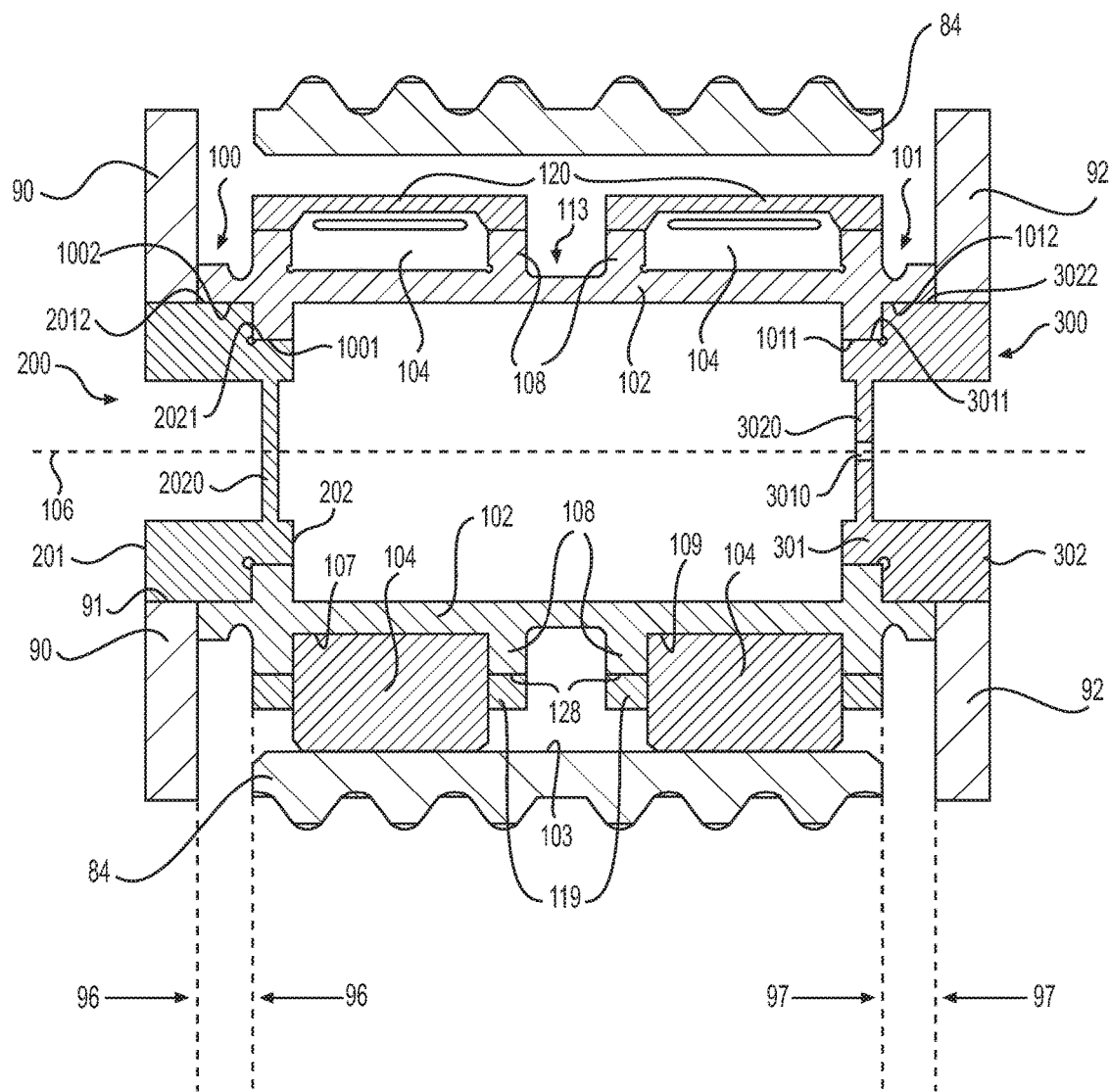
FIG. 3 is a schematic cross-sectional view of some of the components taken generally along the lines of sight designated 3-3 in FIG. 2.
Figure 5:
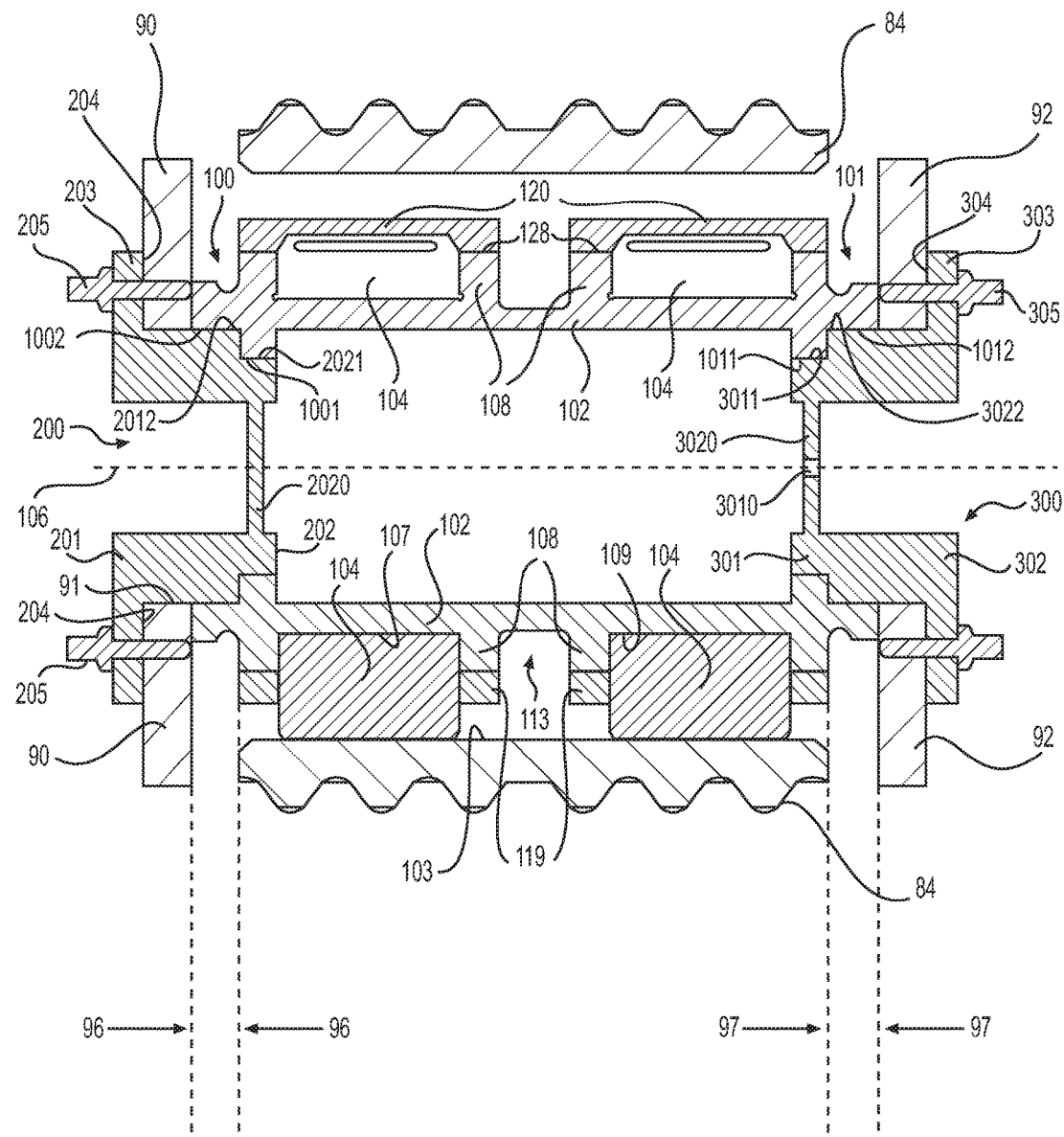
FIG. 5 is a schematic cross-sectional view of some of the components taken generally along the lines of sight designated 5-5 in FIG. 4.

As shown in FIGS. 2, 3, 4, 5 and 6 for example, the planet bearing includes an inner ring 102. Each of FIGS. 2, 4 and 6 is a schematic representation of a half section of an inner ring 102 that is partially a perspective view and partially a cross-sectional view. As shown in FIGS. 3 and 5 for example, the inner ring 102 defines a forward end 100 and an aft end 101 disposed axially spaced apart from the forward end 100. As shown in FIGS. 2, 4 and 6 for example, the inner ring 102 defines a generally cylindrical shape having a virtual central axis of rotation 106, which has a midpoint disposed halfway along the length of the inner ring 102 between the forward end 100 and the aft end 101. As shown in FIG. 2 for example, the inner ring 102 defines an interior surface 112 that defines a hollow interior cavity having a forward opening disposed at the forward end 100 and an aft opening disposed axially spaced apart from the forward opening and disposed at the aft end 101 of the inner ring 102.

As schematically shown in FIGS. 2, 3, 4, 5 and 6 for example, the forward support plug 200 is attached to the inner ring 102 and configured so as to seal off the forward opening at the forward end 100 of the inner ring 102. The forward support plug 200 defines a central web 2020 that extends diametrically across the forward support plug 200 so that the forward support plug 200 closes the forward opening of the inner ring 102. Similarly, the aft plug 300 is attached to the inner ring 102 and configured so as to seal off the aft opening at the aft end 101 of the inner ring 102. The aft support plug 300 defines a central web 3020 that extends diametrically across the aft support plug 300 so that the aft support plug 300 closes the aft opening of the inner ring 102. Though only half of the respective central web 2020, 3020 is visible in the cross-sectional views depicted in FIGS. 2, 4 and 6, the respective central web 2020, 3020 extends completely across the entire diameter of the respective forward support plug 200 and aft support plug 300.

As schematically shown in FIGS. 2, 3, 4, 5 and 6 for example, a lubricant feed hole 3010 is defined axially through the central web 3020 of the aft support plug 300. Desirably, the surface defining the lubricant feed hole 3010 is threaded to receive a pressure fixture (not shown). In operation, oil is fed under pressure through the pressure fixture in any suitable manner via the opening 3010 defined through the central web 3020 of the aft support plug 300 and thence into the hollow interior cavity of the hollow inner ring 102. The oil entering this internal cavity, which is formed by the sealing of both opposite ends 100, 101 of the inner ring 102 by the respective forward plug 200 and aft plug 300, flows from the internal cavity under pressure and thence through the inner ring 102 through oil feed holes (not shown) and radially outwardly so as to lubricate the planet bearing.

Desirably, in accordance with the present invention as explained more fully below and identified schematically in FIGS. 3 and 5, each of the forward support plug 200 and the aft support plug 300 is attached to the respective forward end 100 and aft end 101 of the inner ring 102 in a press-fit along the annular interface that extends along the axially directed dimension that is between the dashed lines and arrows designated 96 and 97 respectively.

As shown in FIGS. 3 and 5 for example, the forward opening of the inner ring 102 is defined by a forward annular surface facing inwardly toward the virtual central axis 106 of rotation. This forward annular surface at the forward end 100 of the inner ring 102 includes a smaller diameter section 1001 that is contiguous with a larger diameter section 1002. The smaller diameter section 1001 at the forward end 100 of the inner ring 102 is disposed closer to the midpoint of the virtual central axis 106 of rotation than the larger diameter section 1002 of the forward annular surface at the forward end 100 of the inner ring 102.

As shown in FIGS. 2, 3, 4, 5 and 6 for example, a forward support plug 200 is configured to be fixed to the carrier and the forward opening of the inner ring 102. The forward support plug 200 defines a generally cylindrical shape about the virtual central axis 106. As shown in FIGS. 3 and 5 for example, the forward support plug 200 has a forward end 201 and an aft end 202 disposed axially apart from the forward end 201 of the forward support plug 200. The aft end 202 of the forward support plug 200 defines an outer annular surface 2021 that is radially equidistant from the virtual central axis 106. As shown in FIGS. 3 and 5 for example, the aft end 202 of the forward support plug 200 is configured to be received within the forward opening of the inner ring 102. The forward end 201 of the forward support plug 200 defines an outer annular surface 2012 that is radially equidistant from the virtual central axis 106 and has a larger diameter than the outer annular surface 2021 of the aft end 202 of the forward support plug 200.

In accordance with the present invention, the forward support plug 200 is attached to the forward end 100 of the inner ring 102 by a press-fit between the outer annular surface 2021 of the forward end 201 of the forward support plug 200 and the larger diameter section 1002 of the forward annular surface of the forward opening of the inner ring 102. This press-fit interface is identified schematically by the axially directed dimension that extends between the dashed lines and arrows designated 96 respectively in each of FIGS. 3 and 5. Thus, the outer annular surface 2021 of the forward end 201 of the forward support plug 200 is non-rotatably fixed by a press-fit to the larger diameter section 1002 of the forward annular surface of the forward opening of the inner ring 102. Similarly, the forward support plug 200 is attached to the forward wall 90 of the carrier by a press-fit between the outer annular surface 2021 of the forward end 201 of the forward support plug 200 and the annular surface that defines the bore 91 that is defined through the forward wall 90 of the carrier, as schematically shown in each of FIGS. 3 and 5.

As shown in FIGS. 3 and 5 for example, the aft end 101 of the inner ring 102 defines the aft opening, which in turn is defined by an aft annular surface facing inwardly toward the virtual central axis 106 of rotation. This aft annular surface at the aft end 101 of the inner ring 102 includes a smaller diameter section 1011 that is contiguous with a larger diameter section 1012. The smaller diameter section 1011 at the aft end 101 of the inner ring 102 is disposed closer to the midpoint of the virtual central axis 106 of rotation than the larger diameter section 1012 of the aft annular surface at the aft end 101 of the inner ring 102.

As shown in FIGS. 2, 3, 4, 5 and 6 for example, an aft support plug 300 is configured to be fixed to the carrier and the aft opening of the inner ring 102. The aft support plug 300 defines a generally cylindrical shape about the virtual central axis 106. As shown in FIGS. 3 and 5 for example, the aft support plug 300 has a forward end 301 and an aft end 302 disposed axially apart from the forward end 301 of the aft support plug 300. The aft end 302 of the aft support plug 300 defines an outer annular surface 2021 that is radially equidistant from the virtual central axis 106. As shown in FIGS. 3 and 5 for example, the forward end 301 of the aft support plug 300 is configured to be received within the aft opening of the inner ring 102. The forward end 301 of the aft support plug 300 defines an outer annular surface 3011 that is radially equidistant from the virtual central axis 106 and has a smaller diameter than the outer annular surface 3022 of the aft end 302 of the aft support plug 300.

In accordance with the present invention, the aft support plug 300 is attached to the aft end 101 of the inner ring 102 by a press-fit between the outer annular surface 3022 of the aft end 302 of the aft support plug 300 and the larger diameter section 1012 of the aft annular surface of the aft opening of the inner ring 102, and this press-fit interface is identified schematically by the axially directed dimension that is between the dashed lines and arrows designated 97 respectively in each of FIGS. 3 and 5. Thus, the outer annular surface 3022 of the aft end 302 of the aft support plug 300 is non-rotatably fixed by a press-fit to the larger diameter section 1012 of the aft annular surface of the aft opening of the inner ring 102. Similarly, the aft support plug 300 is attached to the aft wall 92 of the carrier by a press-fit between the outer annular surface 3022 of the aft end 302 of the aft support plug 300 and the annular surface that defines the bore 93 that is defined through the aft wall 92 of the carrier, as schematically shown in each of FIGS. 3 and 5.

In the embodiment that is schematically depicted in FIGS. 2 and 3 for example, the smaller diameter section 1001 of the forward annular surface of the forward opening of the inner ring 102 desirably defines screw threads. In a complementary fashion, the outer annular surface 2021 of the aft end 202 of the forward support plug 200 defines screw threads that mate with the screw threads of the smaller diameter section 1001 of the forward annular surface of the forward opening of the inner ring 102. Similarly, the smaller diameter section 1011 of the aft annular surface of the aft opening of the inner ring 102 is attached to the outer annular surface 3011 of the forward end 301 of the aft support plug 300 by a screw threaded connection.

In this embodiment schematically depicted in FIGS. 2 and 3 for example, the attachment of each respective support plug 200 or 300 to the respective opening of the inner ring 102 involves reducing the temperature of the respective support plug 200, 300 while heating the inner ring 102. In this way, the diameter of the respective outer annular surface 2012, 3022 becomes reduced while the respective larger diameter section 1002 at forward end 100 of inner ring 102 and the larger diameter section 1012 at aft end 101 of inner ring 102 become expanded to allow the insertion of the respective forward plug 200 into the respective forward opening of the inner ring 102 and insertion of the respective aft plug 300 into the respective aft opening of the inner ring 102. The threaded connection is made between each respective support plug 200 or 300 and the inner ring 102 so that when the temperature of each of the respective support plugs 200, 300 and the inner ring 102 equilibrates to the same temperature, then the desired press-fit seal at the annular interface defined by the schematic representation identified by the respective numerals 96, 97 in FIGS. 3 and 5, respectively, is accomplished.

The seals effected by these threaded connections and/or press-fit connections between the respective smaller diameter sections 1001, 1011 of the inner ring 102 and respective outer annular surfaces 2021, 3011 of the respective forward and aft support plugs 200, 300 must be tight enough to withstand the anticipated operational torque that tends to produce relative rotation between the inner ring 102 and the support plugs 200, 300 during operation of the planet bearing. These seals effected by these threaded connections and press-fit connections between the inner ring 102 and respective forward and aft support plugs 200, 300 also must be tight enough to withstand the anticipated oil pressure within the internal cavity needed in order to adequately lubricate the planet bearing.

A respective press-fit also is effected so as to prevent relative rotation between the forward support plug 200 and the forward wall 90 of the carrier and between the aft support plug 300 and the aft wall 92 of the carrier. In a similar fashion for this embodiment schematically depicted in FIGS. 2 and 3, the press-fit attachment of the assembled inner ring 102 and the respective forward support plug 200 and aft support plug 300 to the forward wall 90 and aft wall 92 of the carrier of the power gearbox 46 involves heating of the walls 90, 92 of the carrier to expand the respective diameters of the respective bores 91, 93 while chilling the assembled inner ring 102 and support plugs 200, 300 to reduce the diameters of the respective outer annular surfaces 2012, 3022 of the respective support plugs 200, 300. This allows each of the respective support plugs 200, 300 to be inserted into its respective bore 91, 93 in the respective carrier wall 90, 92, and then allowing all of the components 90, 92, 102, 200, 300 to equilibrate to the same temperature to effect the desired press-fit between the carrier walls 90, 92 and the assembled inner ring 102 and support plugs 200, 300.

In embodiment schematically depicted in FIGS. 2 and 3 for example, the process of attaching each respective support plug 200, 300 to the inner ring 102 desirably is facilitated by configuring each respective support plug 200, 300 for receiving an assembly tool. Accordingly, as shown in FIG. 2 for example, the forward end 201 of the forward support plug 200 defines an inner surface 2013 facing the virtual central axis 106. This inner surface 2013 defines a recess that is configured for non-rotatably receiving an assembly tool (not shown) that includes a key portion that is configured with a shape that complements the shape of the recess that is defined by the walls that define the inner surface 2013 of the forward support plug 200. Accordingly, as shown in FIG. 2 for example, the inner surface 2013 of the forward end 201 of the forward support plug 200 defines at least one non-cylindrical surface such as a flat surface for rendering the forward support plug 200 non-rotatable with respect to the complementary assembly tool.

Accordingly, as shown in FIG. 2 for example, the aft end 302 of the aft support plug 300 defines an inner surface 3023 facing the virtual central axis 106. This inner surface 3023 defines a recess that is configured for non-rotatably receiving an assembly tool (not shown) that includes a key portion that is configured with a shape that complements the shape of the recess that is defined by the walls that define the inner surface 3023 of the aft support plug 300. Accordingly, as shown in FIG. 2 for example, the inner surface 3023 of the aft end 302 of the aft support plug 300 defines at least one non-cylindrical surface such as a flat surface for rendering the aft support plug 300 non-rotatable with respect to the complementary assembly tool.

Instead of relying upon a press-fit connection between each respective support plug 200, 300 and the respective wall 90, 92 of the carrier of the power gearbox 46 as in the embodiments of FIGS. 2 and 3 for example in order to preclude relative movement between the carrier walls 90, 92 and the respective support plugs 200, 300, alternative embodiments of the present invention rely upon one or more selectively detachable mechanical fasteners to connect the support plugs 200, 300 to the walls 90, 92 of the carrier. Accordingly, as shown in FIGS. 4, 5 and 6 for example, the forward support plug 200 includes a flange 203 that extends diametrically from the virtual central axis of rotation 106. As shown schematically in FIG. 5 for example, the flange 203 forms a collar extending away from the outer annular surface 2012 of the forward end 201 of the forward support plug 200. The flange 203 is disposed spaced apart axially from the forward end 100 of the inner ring 102 to define a recess between the aft surface 204 of the flange 203 and the forward end 100 of the inner ring 102. This recess is configured to receive a section of the forward wall 90 of the carrier that nests within this recess. A plurality of selectively detachable mechanical fasteners such as threaded bolts 205 can be provided to prevent relative rotation between the forward support plug 200 and the forward wall 90 of the carrier. These mechanical fasteners 205 can be screwed into threaded holes that are defined through the flange 203 and that are aligned with similar threaded blind holes that extend into the carrier's forward wall 90 beginning from the forward surface of the carrier's forward wall 90.

Similarly, as shown in FIGS. 4, 5 and 6 for example, the aft support plug 300 includes a flange 303 that extends diametrically from the virtual central axis of rotation 106. As shown schematically in FIG. 5 for example, the flange 303 forms a collar extending away from the outer annular surface 3022 of the forward end 201 of the forward support plug 200. The flange 303 is disposed spaced apart axially from the aft end 101 of the inner ring 102 to define a recess between the forward surface 304 of the flange 303 and the aft end 101 of the inner ring 102. This recess is configured to receive a section of the aft wall 92 of the carrier that nests within this recess. A plurality of selectively detachable mechanical fasteners such as threaded bolts 305 can be provided to prevent relative rotation between the aft support plug 300 and the aft wall 92 of the carrier. These mechanical fasteners 305 can be screwed into threaded holes that are defined through the flange 303 and that are aligned with similar threaded blind holes that extend into the carrier's aft wall 92 beginning from the aft surface of the carrier's aft wall 92.

FIG. 6 illustrates an embodiment that employs yet another way of configuring the press-fit connections between the respective smaller diameter sections 1001, 1011 of the inner ring 102 and respective outer annular surfaces 2021, 3011 of the respective forward and aft support plugs 200, 300 in order to be able to withstand the anticipated operational torque that tends to produce relative rotation between the inner ring 102 and the support plugs 200, 300 during operation of the planet bearing. The smaller diameter section 1001 of the forward annular surface of the forward opening of the inner ring 102 defines at least one non-cylindrical surface 1003. Desirably, the configuration of the other half of the components shown in FIG. 6 would be a mirror image of that which is depicted therein, and thus there would be a second non-cylindrical surface 1003 provided for the smaller diameter section 1001. The outer annular surface 2021 of the aft end 202 of the forward support plug 200 defines at least one complementary non-cylindrical surface 2023 that mates with the respective non-cylindrical surface 1003 of the smaller diameter section 1001 of the forward annular surface of the forward opening of the inner ring 102 and thereby renders the forward support plug 200 non-rotatable with respect to the inner ring 102. Though only the forward support plug 200 is shown in FIG. 6, the same configuration equally can be provided to the configuration of the aft support plug 300 and thus to the smaller diameter section 3011 of the aft annular surface of the aft opening of the inner ring 102.

Desirably, the planet bearing desirably is inner-race-guided and formed as a single, unitary component. As shown in FIGS. 3 and 5 for example, the single component inner ring 102 desirably has disposed opposite the inner surface 112 thereof, an outer surface 113 that defines at least one roller track that defines at least one roller raceway 107, 109 constituting an inner race of the planet bearing. In a dual track embodiment, each one of the pair of tracks that is defined in the inner ring 102 is separated in the axial direction from the other one of the pair of tracks. In the dual track embodiment, the outer surface 113 of the inner ring 102 defines two roller raceways 107, 109 disposed side-by-side and separated from each other in the axial direction along the virtual central axis 106. Each of the roller raceways 107, 109 functions as an inner race 107, 109 of the dual track planet bearing. As shown in FIG. 4 for example, each of the pair of tracks extends circumferentially around the outer surface of the inner ring 102. Each of the pair of tracks is disposed parallel in the circumferential direction with respect to the other track in the pair of tracks.

As shown in FIGS. 3 and 5 for example, each respective track is defined by a pair of guiderails 108, which are spaced apart from each other in the axial direction parallel to the virtual central axis 106 and extend circumferentially around the inner ring 102. As contemplated herein, the inner ring 102 can include a single track or a plurality of tracks such as a dual track inner ring 102 or a triple track inner ring 102, etc. However, explanation of the structure and operation of the planet gearbox herein will use the specific example of a dual track inner ring 102, thus informing how additional tracks would be accommodated or a single track would remain after the elimination of one of the dual tracks.

Accordingly, as shown in FIGS. 3 and 5 for example, in a dual track embodiment, the outer surface 113 of the inner ring 102 incorporates two pairs of guiderails 108, which extend continuously in the circumferential direction around the inner ring 102. Each of the pair of tracks defines a surface in the form of a raceway 107 or 109 that extends circumferentially and concentrically with respect to the cylindrical inner surface 112 of the of the inner ring 102. Each pair of guiderails 108 defines one of the two annular inner races 107, 109, a forward raceway 107 and an aft raceway 109, respectively, axially spaced apart from each other. Thus, each track includes a respective raceway 107, 109 that provides the surface that contacts the cylindrical outer surface 114 of each of the plurality of rotatable members such as rollers 104, which are rotatably disposed within the respective track of the inner ring 102. The use of a single inner ring 102 with dual raceways 107, 109 spaced axially apart from each other provides for good concentricity between sets of rollers 104, but two separate inner rings 102 could be used as well. The axial dimension of the inner ring 102 desirably is sized so that the inner ring 102 cannot move axially relative to the opposing and axially spaced apart walls 90, 92 of the carrier.

As schematically shown in FIGS. 3 and 5 for example, each guiderail 108 includes an exterior surface 128 that extends continuously in the circumferential direction around the outer surface 113 of the inner ring 102 and is disposed radially outwardly from a respective annular raceway 107, 109 defined in the outer surface 113 of the inner ring 102. The exterior surface 128 of each guiderail 108 defines the largest diametric dimension of the outer surface 113 of the inner ring 102 and provides respective guiding surfaces to each respective roller cage 118 (described more fully below).

As shown in FIGS. 2, 4 and 6 for example, the planet gear 84 desirably is a single-piece component that forms both the outer race and the gear tooth surface 85 of the planet bearing. As shown in FIGS. 3 and 5 for example, the cylindrical interior surface 103 of the planet gear 84 of the planet bearing contacts and retains the rollers 104 of the planet bearing. Thus, an outer cylindrical surface of the outer ring 84 of the planet bearing is defined by a gear tooth surface 85 that is configured to mesh with both the gear tooth surface 81 of the sun gear 80 and the gear tooth surface 87 of the ring gear 86. Desirably, the gear tooth surface 85 of each cylindrical outer ring 84 is patterned with a double helical gear tooth surface with the bias of each one of the two double helical gear tooth surfaces of the outer ring 84 being disposed nonparallel with the other one of the two double helical gear tooth surfaces of the outer ring 84.

As shown in FIGS. 2, 4 and 6 for example, a plurality of cylindrical rollers 104 is disposed between the inner ring 102 and the cylindrical interior surface 103 of the planet gear 84 that serves as the outer race of the planet bearing. Each of the pair of tracks in the inner ring 102 is configured to receive and rotatably guide therein a respective plurality of cylindrical rollers 104, which are free to rotate relative to both the inner raceways 107, 109 and the outer race 103 of the planet bearing. The cylindrical rollers 104 can comprise a ceramic material of a known composition, for example silicon nitride ($Si_3Ni_4$).

In the exemplary dual track embodiment of the inner-race-guided planet gearbox illustrated in FIGS. 4 and 6 for example, two separate roller cages 118 desirably are disposed between the inner ring 102 and the outer ring 84. Because the inner ring 102 has side-by-side dual tracks, a separate roller cage 118 is provided over each of the dual tracks. Each roller cage 118 is free to rotate with respect to both the inner ring 102 and the outer ring 84, but at a different speed than the speed of rotation of the outer ring 84. Each roller cage 118 defines its own circumferential row of generally rectangular openings disposed above a respective track of the pair of tracks of the inner ring 102.

As shown in FIGS. 3 and 5 for example, each generally rectangular opening of the roller cage 118 is bounded by a pair of opposing, parallel and spaced apart shoulder elements 119 that elongate in the circumferential direction. Respective web elements 120 of each roller cage 118 are disposed to extend axially between the opposing shoulder elements 119 of the roller cage 118. All of the webs 120 of both roller cages 118 are identically configured and dimensioned. Each roller cage 118 is configured with circumferentially extending shoulder elements 119 and axially extending web elements 120 to maintain in each respective track with its respective raceway 107, 109 of the inner ring 102, a respective separation in the circumferential direction between each respective cylindrical roller 104 in each pair of circumferentially adjacent cylindrical rollers 104 in that respective track.

As shown in FIGS. 3 and 5 for example, each respective shoulder element 119 of each roller cage 118 is disposed above a respective guiderail 108 of the inner ring 102 with a close clearance between the two respective opposing surfaces of the shoulder element 119 and the guiderail 108. Because the planet bearing is inner-race-guided, the roller cage 118 is designed with a close clearance between the cylindrically-shaped, circumferential inner surface defined by the shoulder elements 119 of the cage 118 and the cylindrically-shaped, circumferential outer surfaces 128 of the guiderails 108 of the inner ring 102, and this close clearance desirably is on the order of 0.005 to 0.050 inches inclusive.

For the embodiment depicted, the planet roller bearing may be formed of any suitable material. For example, in at least certain exemplary embodiments, the roller bearing may be formed of a suitable metal material, such as a chrome steel or a high carbon chrome steel. Alternatively, in other exemplary embodiments, the planet roller bearing may include one or more components formed of a suitable ceramic material.

The planet gearbox with its planet bearing apparatus described herein has several advantages over the prior art. Replacing the conventional support pin of each planet bearing with the opposing pair of forward and aft support plugs 200, 300 lowers the overall weight of the apparatus. Eliminating the spanner nuts needed for attaching the conventional support pins to the carrier allows for smaller axial packaging of the power gearbox 46, easier and more reliable assembly and disassembly of the power gearbox 46, provides the power gearbox 46 with a more robust design (due to the lower clamp loads) and potentially eliminates a machining surface that otherwise would exist during some failure scenarios of the power gearbox 46.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A planet gearbox for connection to a carrier of an epicyclic gearing arrangement that includes a sun gear and a ring gear surrounding the planet gearbox and the sun gear, the planet gearbox comprising:

an inner ring defining a substantially cylindrical shape having a virtual central axis of rotation, the inner ring defining a forward end and an aft end, the aft end of the inner ring disposed axially spaced apart from the forward end of the inner ring, the virtual central axis of rotation having a midpoint disposed halfway along a length of the inner ring, the inner ring having an interior surface that defines a hollow interior cavity having a forward opening and an aft opening, the aft opening of the inner ring disposed axially spaced apart from the forward opening of the inner ring, the forward opening of the inner ring being defined by a forward annular surface facing inwardly toward the virtual central axis of rotation and having a larger diameter section and a smaller diameter section, the smaller diameter section of the forward opening of the inner ring being disposed closer to the midpoint of the virtual central axis of rotation than the larger diameter section of the forward opening of the inner ring, the aft opening of the inner ring being defined by an aft inner annular surface facing inwardly toward the virtual central axis of rotation and having a larger diameter section and a smaller diameter section, the smaller diameter section of the aft opening of the inner ring being disposed closer to the midpoint of the virtual central axis of rotation the larger diameter section of the aft opening of the inner ring, the inner ring defining an outer surface facing outwardly away from the virtual central axis of rotation, the outer surface of the inner ring defining at least one track, each track of the at least one track being configured to receive and rotatably guide therein a respective plurality of rotatable members, each rotatable member of the respective plurality of rotatable members being freely rotatable with respect to the outer surface of a respective track of the at least one track of the inner ring;

a forward support plug configured to be fixed to the carrier and the forward opening of the inner ring, the forward support plug defining a substantially cylindrical shape about the virtual central axis of rotation, the forward support plug having a forward end and an aft end, the aft end of the forward support plug disposed axially apart from the forward end of the forward support plug, the aft end of the forward support plug defining an outer surface that is radially equidistant from the virtual central axis and configured to be received within the forward opening of the inner ring, the forward end of the forward support plug defining an outer surface that is radially equidistant from the virtual central axis and has a larger diameter than the outer surface of the aft end of the forward support plug; and an aft support plug configured to be fixed to the carrier and the aft opening of the inner ring, the aft support plug defining a substantially cylindrical shape about the virtual central axis of rotation, the aft support plug having a forward end and an aft end, the aft end of the aft support plug disposed axially apart from the forward end of the aft support plug, the forward end of the aft support plug defining an outer surface that is radially equidistant from the virtual central axis and configured to be received within the aft opening of the inner ring, the aft end of the aft support plug defining an outer surface that is radially equidistant from the virtual central axis and has a larger diameter than the outer surface of the forward end of the aft support plug;

wherein the outer surface of the forward end of the forward support plug is fixed by a press fit to the larger diameter section of the forward annular surface of the forward opening of the inner ring; and wherein the outer surface of the aft end of the aft support plug is fixed by a press fit to the larger diameter section of the aft annular surface of the aft opening of the inner ring.

2. The planet gearbox of claim 1, wherein the smaller diameter section of the forward annular surface of the forward opening of the inner ring defines screw threads, and the outer surface of the aft end of the forward support plug defines screw threads that mate with the screw threads of the smaller diameter section of the forward annular surface of the forward opening of the inner ring.

3. The planet gearbox of claim 1, wherein the smaller diameter section of the aft annular surface of the aft opening of the inner ring is attached to the outer surface of the forward end of the aft support plug by a screw threaded connection.

4. The planet gearbox of claim 1, wherein the forward support plug includes a flange that extends diametrically from the outer surface of the forward end of the forward support plug, the flange is spaced apart axially from the forward end of the inner ring to define between the flange and the forward end of the inner ring a recess, the recess configured to receive a section of the carrier.

5. The planet gearbox of claim 1, wherein the aft support plug includes a flange that extends diametrically from the outer surface of the aft end of the aft support plug, the flange is spaced apart axially from the aft end of the inner ring to define between the flange and the aft end of the inner ring a recess, the recess configured to receive a section of the carrier.

6. The planet gearbox of claim 1, wherein the smaller diameter section of the forward annular surface of the forward opening of the inner ring defines at least one non-cylindrical surface, and the outer surface of the aft end of the forward support plug defines at least one non-cylindrical surface that mates with a respective non-cylindrical surface of the at least one non-cylindrical surface of the smaller diameter section of the forward annular surface of the forward opening of the inner ring and thereby renders the forward support plug non-rotatable with respect to the inner ring.

7. The planet gearbox of claim 6, wherein each of the at least one non-cylindrical surfaces of the outer surface of the aft end of the forward support plug and of the smaller diameter section of the forward annular surface of the forward opening of the inner ring defines a flat plane.

8. The planet gearbox of claim 1, wherein the smaller diameter section of the aft annular surface of the aft opening of the inner ring defines at least one non-cylindrical surface, and the outer surface of the forward end of the aft support plug defines at least one non-cylindrical surface that mates with a respective non-cylindrical surface of the at least one non-cylindrical surface of the smaller diameter section of the aft annular surface of the aft opening of the inner ring and thereby renders the aft support plug non-rotatable with respect to the inner ring.

9. The planet gearbox of claim 8, wherein each of the at least one non-cylindrical surfaces of the outer surface of the forward end of the aft support plug and of the smaller diameter section of the aft annular surface of the aft opening of the inner ring defines a flat plane.

10. The planet gearbox of claim 1, wherein the forward end of the forward support plug defines an inner surface facing the virtual central axis of rotation and configured for receiving an assembly tool.

11. The planet gearbox of claim 10, wherein the inner surface of the forward end of the forward support plug defining at least one non-cylindrical surface for rendering the forward support plug non-rotatable with respect to the assembly tool when the assembly tool is inserted into a space defined by the inner surface of the forward end of the forward support plug.

12. The planet gearbox of claim 1, wherein the aft end of the aft support plug defines an inner surface facing the virtual central axis of rotation and configured for receiving an assembly tool.

13. The planet gearbox of claim 12, wherein the inner surface of the aft end of the aft support plug defining at least one non-cylindrical surface for rendering the aft support plug non-rotatable with respect to the assembly tool when the assembly tool is inserted into a space defined by the inner surface of the aft end of the aft support plug.

14. The planet gearbox of claim 1, wherein the aft support plug defines a web that extends diametrically across the aft support plug so that the aft support plug closes the aft opening of the inner ring with the exception of a lubricant feed hole that is defined axially through the web.

15. The planet gearbox of claim 1, wherein the forward support plug defines a web that extends diametrically across the forward support plug so that the forward support plug closes the forward opening of the inner ring.

16. The planet gearbox of claim 1, wherein each rotatable member of the respective plurality of rotatable member is a roller.

17. The planet gearbox of claim 16, wherein each rotatable member of the respective plurality of rotatable member is a cylindrical roller.

18. The planet gearbox of claim 1, wherein each rotatable member of the respective plurality of rotatable member is a spherical ball.

19. A gas turbine engine comprising:
a fan including a plurality of blades extending radially from a hub and rotatable about a first axis of rotation defined centrally through the hub;
a compressor disposed downstream from the fan;
a turbine disposed downstream of the compressor;
a rotatable input shaft mechanically coupling the compressor to rotate in unison with the turbine;
an epicyclic gearing arrangement that has only a single input and that includes a carrier, a sun gear rotatable about a second axis of rotation that is parallel to the first axis of rotation, a ring gear disposed circumferentially around the sun gear, a planet gearbox that is carried by the carrier and houses a at least one planet gear rotatable with respect to the carrier about a third axis of rotation that is parallel to the second axis of rotation, wherein the at least one planet gear meshes with both the sun gear and the ring gear; and
an engine envelope surrounding the fan, the compressor, the turbine and the epicyclic gearing arrangement, wherein one of the ring gear and the carrier is non-rotatably coupled to the engine envelope; and
the planet gearbox further including:
an inner ring defining a substantially cylindrical shape having a virtual central axis of rotation, the inner ring defining a forward end and an aft end, the aft end of the inner ring disposed axially spaced apart from the forward end of the inner ring, the virtual central axis of rotation having a midpoint disposed halfway along the length of the inner ring, the inner ring having an interior surface that defines a hollow interior cavity having a forward opening and an aft opening, the aft opening of the inner ring disposed axially spaced apart from the forward opening of the inner ring,
the forward opening of the inner ring being defined by a forward annular surface facing inwardly toward the virtual central axis of rotation and having a larger diameter section and a smaller diameter section, the smaller diameter section of the forward opening of the inner ring being disposed closer to the midpoint of the virtual central axis of rotation than the larger diameter section of the forward opening of the inner ring,
the aft opening of the inner ring being defined by an aft inner annular surface facing inwardly toward the virtual central axis of rotation and having a larger diameter section and a smaller diameter section, the smaller diameter section of the aft opening of the inner ring being disposed closer to the midpoint of the virtual central axis of rotation than the larger diameter section of the aft opening of the inner ring,
the inner ring defining an outer surface facing outwardly away from the virtual central axis of rotation, the outer surface of the inner ring defining at least one track, each track of the at least one track being configured to receive and rotatably guide therein a respective plurality of rotatable members, each rotatable member of the respective plurality of rotatable members being freely rotatable with respect to the outer surface of a respective track of the at least one track of the inner ring;
a forward support plug configured to be fixed to the carrier and the forward opening of the inner ring, the forward support plug defining a substantially cylindrical shape about the virtual central axis of rotation, the forward support plug having a forward end and an aft end, the aft end of the forward support plug disposed axially apart from the forward end of the forward support plug, the aft end of the forward support plug defining an outer surface that is radially equidistant from the virtual central axis and configured to be received within the forward opening of the inner ring, the forward end of the forward support plug defining an outer surface that is radially equidistant from the virtual central axis and has a larger diameter than the outer surface of the aft end of the forward support plug; and
an aft support plug configured to be fixed to the carrier and the aft opening of the inner ring, the aft support plug defining a substantially cylindrical shape about the virtual central axis of rotation, the aft support plug having a forward end and an aft end, the aft end of the aft support plug disposed axially apart from the forward end of the aft support plug, the forward end of the aft support plug defining an outer surface that is radially equidistant from the virtual central axis and configured to be received within the aft opening of the inner ring, the aft end of the aft support plug defining an outer surface that is radially equidistant from the virtual central axis and has a larger diameter than the outer surface of the forward end of the aft support plug;
wherein the outer surface of the forward end of the forward support plug is fixed by a press fit to the larger diameter section of the forward annular surface of the forward opening of the inner ring; and
wherein the outer surface of the aft end of the aft support plug is fixed by a press fit to the larger diameter section of the aft annular surface of the aft opening of the inner ring.

20. The planet gearbox of claim 19, wherein the forward support plug includes a flange that extends diametrically from the outer surface of the forward end of the forward support plug, the flange is spaced apart axially from the forward end of the inner ring to define between the flange and the forward end of the inner ring a recess that receives a section of the carrier and wherein at least one fastener attaches the flange to the carrier in a manner that renders the forward support plug non-rotatable with respect to the carrier.

* * * * *